US011215906B2

(12) United States Patent
Boerup

(10) Patent No.: US 11,215,906 B2
(45) Date of Patent: Jan. 4, 2022

(54) CAMERA ACCESSORY HOUSING DEVICE

(71) Applicant: MGMD BrainPower LLC, Tucson, AZ (US)

(72) Inventor: Spencer Boerup, Tucson, AZ (US)

(73) Assignee: MGMD Brainpower LLC, Tucson, AZ (US)

( * ) Notice: Subject to any disclaimer, the term of this patent is extended or adjusted under 35 U.S.C. 154(b) by 0 days.

(21) Appl. No.: 16/437,480

(22) Filed: Jun. 11, 2019

(65) Prior Publication Data

US 2019/0377245 A1 Dec. 12, 2019

Related U.S. Application Data

(60) Provisional application No. 62/683,517, filed on Jun. 11, 2018.

(51) Int. Cl.
*G03B 17/56* (2021.01)
*G03B 17/14* (2021.01)
*G03B 15/02* (2021.01)

(52) U.S. Cl.
CPC .......... *G03B 17/561* (2013.01); *G03B 15/02* (2013.01); *G03B 17/14* (2013.01); *G03B 17/563* (2013.01); *G03B 17/566* (2013.01); *G03B 2215/055* (2013.01); *G03B 2215/056* (2013.01)

(58) Field of Classification Search
None
See application file for complete search history.

(56) References Cited

U.S. PATENT DOCUMENTS

| | | | | |
|---|---|---|---|---|
| 3,918,078 A | * | 11/1975 | Savage | G03B 17/12 396/545 |
| 4,052,607 A | * | 10/1977 | Larson | G03B 15/02 362/18 |
| 4,122,470 A | * | 10/1978 | Loranger | G03B 11/00 396/337 |
| 4,380,787 A | * | 4/1983 | Stone | G03B 15/05 362/16 |
| 4,394,692 A | * | 7/1983 | Randmae | H04N 5/2252 348/143 |
| 4,484,805 A | * | 11/1984 | Gizzio | G03B 15/00 396/337 |
| 4,777,566 A | * | 10/1988 | Lowell | G03B 15/02 362/18 |
| 4,991,063 A | * | 2/1991 | Stoneham | F21V 13/04 362/18 |

(Continued)

FOREIGN PATENT DOCUMENTS

WO 2012-038726 3/2012

OTHER PUBLICATIONS

PCT International Search Report and Written Opinion in International Application PCT/US2019/036535, dated Oct. 4, 2019, 10 pages.

*Primary Examiner* — William B Perkey

(57) ABSTRACT

A camera accessory housing device has a connector element that receives a camera accessory. The connector element may be a substantially planar ferromagnetic plate that couples to a sustainably planar face of a camera accessory. The camera accessory may a have a camera accessory attachment element, such as a band with magnets. The magnets facilitate coupling of the camera accessory to the connector element.

18 Claims, 11 Drawing Sheets

(56) References Cited

U.S. PATENT DOCUMENTS

| | | | | |
|---|---|---|---|---|
| 5,455,625 A * | 10/1995 | Englander | B60R 11/04 | 348/372 |
| 7,037,007 B2 * | 5/2006 | Ohmori | G03B 11/041 | 348/375 |
| 7,883,222 B2 * | 2/2011 | Elias | G03B 11/045 | 353/97 |
| 8,313,203 B1 * | 11/2012 | Guiney | G03B 15/02 | 362/18 |
| 8,837,928 B1 * | 9/2014 | Clearman | E05B 17/2019 | 396/25 |
| 8,957,835 B2 * | 2/2015 | Hoellwarth | G06F 3/041 | 345/8 |
| 9,357,114 B1 * | 5/2016 | Whitehead | H04N 5/247 | |
| 9,661,195 B2 * | 5/2017 | Jing | G03B 17/08 | |
| 9,864,257 B1 * | 1/2018 | Wroblewski | G03B 17/04 | |
| 9,998,637 B2 * | 6/2018 | Burkholder | H04N 5/2252 | |
| 10,054,846 B1 * | 8/2018 | Boerup | G03B 17/565 | |
| 2005/0200306 A1 * | 9/2005 | Conway | G03B 15/07 | 315/291 |
| 2007/0041201 A1 * | 2/2007 | Mazzei | G03B 15/02 | 362/347 |
| 2007/0076115 A1 * | 4/2007 | Hirooka | G03B 17/02 | 348/340 |
| 2007/0077062 A1 * | 4/2007 | Senba | H04N 5/23209 | 396/529 |
| 2008/0204883 A1 * | 8/2008 | Fong | G03B 15/02 | 359/599 |
| 2008/0259588 A1 | 10/2008 | Fong | | |
| 2008/0316754 A1 | 12/2008 | Lau | | |
| 2011/0064401 A1 | 3/2011 | Desorbo | | |
| 2012/0075861 A1 * | 3/2012 | Yang | G03B 15/02 | 362/249.03 |
| 2013/0315577 A1 * | 11/2013 | Clark | G03B 29/00 | 396/27 |
| 2016/0109784 A1 * | 4/2016 | Xu | G03B 15/03 | 348/370 |
| 2017/0057423 A1 | 3/2017 | Wang | | |
| 2018/0266659 A1 * | 9/2018 | Ho | F21V 9/40 | |
| 2019/0250485 A1 * | 8/2019 | Richins | F16M 13/022 | |
| 2019/0377245 A1 * | 12/2019 | Boerup | G03B 17/14 | |

* cited by examiner

CAMERA ACCESSORY HOUSING DEVICE

CROSS-REFERENCE TO RELATED APPLICATIONS

This application claims priority to and the benefit of U.S. Provisional Application No. 62/683,517, filed Jun. 11, 2018, titled "CAMERA ACCESSORY HOUSING DEVICE," the disclosure of which is hereby incorporated by reference herein in its entirety.

INTRODUCTION

To aid in the use of cameras, accessory devices may be used. Camera accessory devices may include flash units, light meters, viewfinders, rangefinders, etc. Some known accessory devices attach directly to the cameras. However, independent housing stands may also be utilized. As such, one or more camera accessory devices may be used in conjunction with a camera without disrupting the mobility of the camera.

Currently, attaching camera accessory devices to the housing stand presents challenges. For example, certain housing stands include numerous components and/or unwieldy mechanisms that are easily lost or misplaced. Further, other housing stands are manufactured for a specific make of camera accessories, and thus, are not easily interchangeable.

Further, some known housing stands also facilitate the attachment of peripheral devices that can be used with the camera accessory devices. For example, grids, filters, diffusers, and/or light directing devices may be utilized with flash units. However, these peripheral devices may not be interchangeable on the housing stand, and they often require that multiple housing stands are used.

It is with respect to these and other considerations that the technologies described below have been developed. Also, although relatively specific problems have been discussed, it should be understood that the embodiments should not be limited to solving the specific problems identified in the introduction.

Camera Accessory Housing Device

Aspects of the technology relate to a housing device for camera accessories. The housing device is configured to receive and secure one or more devices, such as flash units (e.g., a SPEEDLITE). In an example, the housing device forms one or more openings. The housing device receives the flash unit such that light from the flash unit passes through the one or more openings for use with the camera. In aspects of the technology, a support element is coupled to one end of the housing device which supports the flash unit within the housing device. When secured in the housing device, the flash unit abuts a connection element (e.g., an interior wall) that is disposed on the opposite end of the housing device.

In an example, the connection element is ferromagnetic such that the flash units may be magnetically coupled to the housing device and secured therein via a separate attachment element secured on the flash unit. In alternative/additional examples, the connection element includes snaps, hook and loop fasteners, or other known connection devices. It will be appreciated that, while reference is made throughout this disclosure to magnetic elements, alternative/additional connection elements may be used. The flash unit attachment element may be flexible so as to accommodate different shape, sizes, and/or models of the flash unit. Additionally, peripheral devices (e.g., a grid, a filter, a light directing device, etc.) may be magnetically coupled to the housing device on the opposite side of the flash unit for use during camera operation. With this configuration, positioning, and securing the flash units and/or peripheral devices in the housing device may easily occur, even in outdoor and/or inclement weather conditions. Additionally, since there are fewer moving components of the housing device than currently available, the possibility of losing and misplacing components is reduced. Further, the flash units and/or peripheral devices are quickly and easily changed out as required or desired during camera use without undesirable disruptions.

In an aspect of the technology, a device for housing one or more camera accessories for use with a camera is provided. The device may include a housing that includes a first end and an opposite second end. The housing may define at least one opening extending therethrough. The at least one opening is configured to receive at least a portion of a camera accessory of the one or more camera accessories. Further, the at least one support element is disposed at the first end. The support element may include a cover rotatably coupled to the first end. Additionally, a connector element may be disposed at the second end. The camera accessory may be removably securable within the at least one opening abutting the connector element. For example, the connector element may be a ferromagnetic plate that serves as a magnetic anchor point to a magnet of the camera accessory.

In aspects, the housing may define a longitudinal axis extending from the first end to the second end, and the cover may be rotatable around a rotation axis that is substantially orthogonal to the longitudinal axis. Further, the cover may be rotatably coupled to the first end by a hinge. Additionally, the housing, may further include a divider that separates the at least one opening into a first opening and a second opening, the first opening and the second opening each having a discrete support element. In some aspects, the divider extends from the first end of the housing. The device may also include a shoe plate. The connector element may include one of a magnet connector, a snap connector, a clamp connector, or a threaded connector.

The device may also include at least one attachment element configured to removably couple to the connector element. The connector element may be a ferromagnetic plate, and the at least one attachment element includes one or more magnets. Further, the at least one attachment element may be magnetically coupleable to the connector element. The first attachment element may be a substantially ring shaped. Additionally, the first attachment element may include a connector surface and an opposing peripheral device surface, wherein the peripheral device surface includes one of a grid, a filter, or a light directing device. The second attachment element of the at least one attachment element may include a flexible body configured to secure to at least a portion the camera accessory. The device may also include a removal latch pivotably coupled to the housing. The removal latch may be configured to de-couple the at least one attachment element from the connector element. The removal latch may includes a handle and a lever arm, and the handle may be pivotable from a first position to a second position. Further, when the handle is in the second position, the lever arm may extend from the second end of the housing and engages with the at least one attachment element, urging at least a portion of the at least one attachment element away from the connector element. The removal latch may pivot about a pivot axis that is substantially orthogonal to a longitudinal axis defined by the housing and a rotation axis defined by the cover. The cover may be substantially U-shaped. When the camera accessory is secured within the at least one opening, the cover may extend around at least a portion of the camera accessory.

Aspects of the technology also include a device for mounting a plurality of flash units for use with a camera. The device may include a substantially circular housing including a first end and an opposite second end. The housing may further include a divider forming a plurality of symmetrical openings extending through the housing, wherein each opening of the plurality of openings is configured to receive at least a portion of a flash unit of the plurality of flash units. The device may also include a plurality of covers rotatably coupled to the first end, each cover of the plurality of covers may correspond to an opening of the plurality of openings. A ferromagnetic plate may be disposed at the second end. Each flash unit of the plurality of flash units may be configured to removable secure within the corresponding opening of the plurality of openings while abutting the magnetic plate. The device may include a flexible body configured to attach around at least a portion of each flash unit. The flexible body may include at least one magnet configured to magnetically couple to the magnetic plate. The device may include a soft box, and the soft box may include a magnetic ring configured to magnetically couple to the magnetic plate.

Aspects of the technology include a method of positioning one or more flash units within a device for use with a camera. The method may include positioning the one or more flash units at least partially within one or more corresponding openings defined by a housing of the device, the housing including a connector element disposed on a first end, and wherein at least a portion of the one or more flash units abuts the connector element. The method may include rotating one or more covers to removably support the one or more flash units within the housing between the one or more covers and the connector element, wherein the one or more covers are rotatably coupled to a second end of the housing. The method may include magnetically coupling an attachment element to the connector element, wherein the attachment element includes one or more of a grid, a filter, or a light directing device.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claim hereof as well as the appended drawings.

It is to be understood that both the foregoing introduction and the following detained description are exemplary and explanatory and are intended to provide further explanation of the invention as claimed.

BRIEF DESCRIPTION OF THE DRAWINGS

Non-limiting and non-exhaustive embodiments are described with reference to the following figures.

DETAILED DESCRIPTION

Before the housing devices and methods of positioning that are the subject of this disclosure are described, it is to be understood that this disclosure is not limited to the particular structures, process step, or materials disclosed herein, but is extended to equivalents thereof as would be recognized by those ordinarily skilled in the relevant arts. It should also be understood that terminology employed herein is used for the purpose of describing particular examples only and is not intended to be limiting. It must be noted that, as used in this specification, the singular forms "a," "an," and "the" include plural referents unless the context clearly dictates otherwise. As used in this disclosure, a camera is an optical instrument that records images. The images may be stored locally, transmitted to another location, or both. These images may be still photographs or moving images such as videos or movies. The medium upon which the images are stored may be video tape, digital media (RAM, ROM, CD, solid state drives, etc.), film, or any other now known or later developed medium suitable for storing images.

Figure 1A:
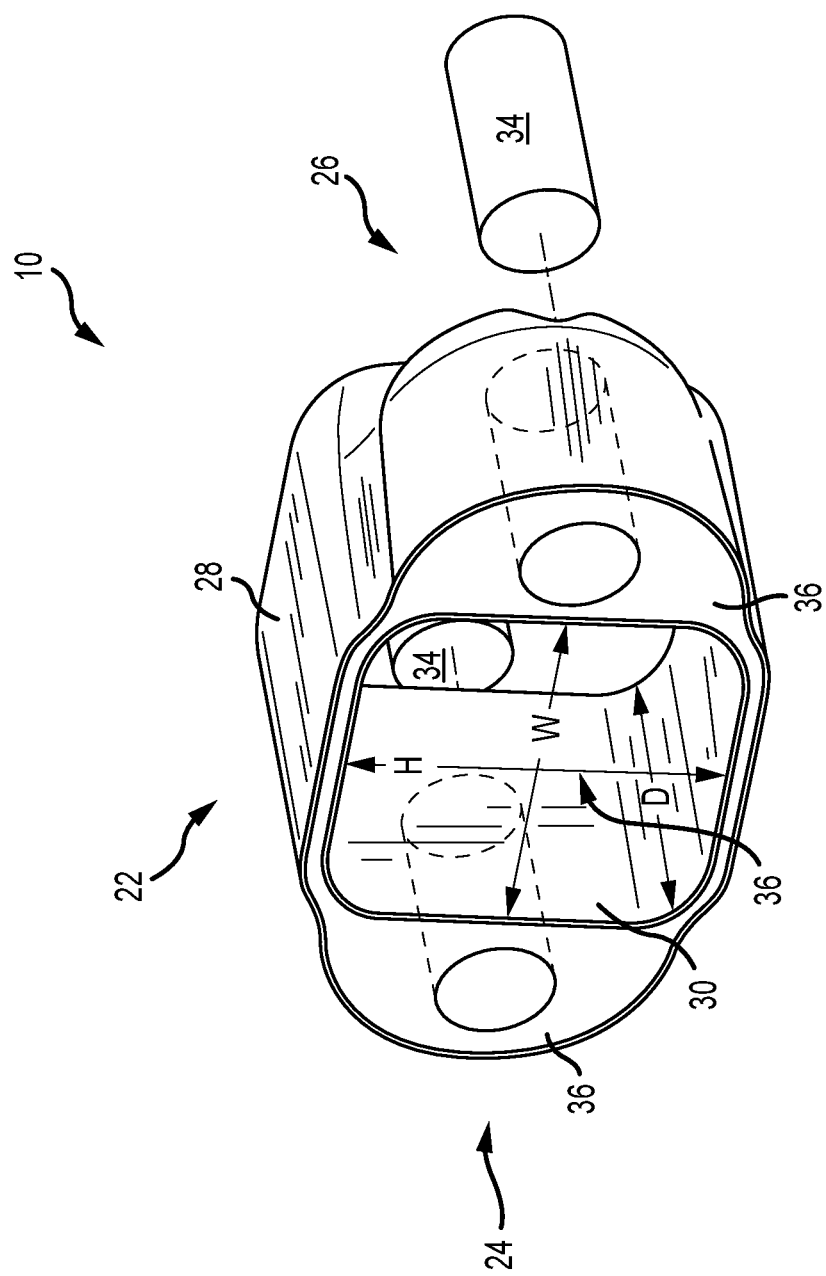
FIG. 1A is a perspective view of an exemplary camera accessory attachment element.
Figure 1B:
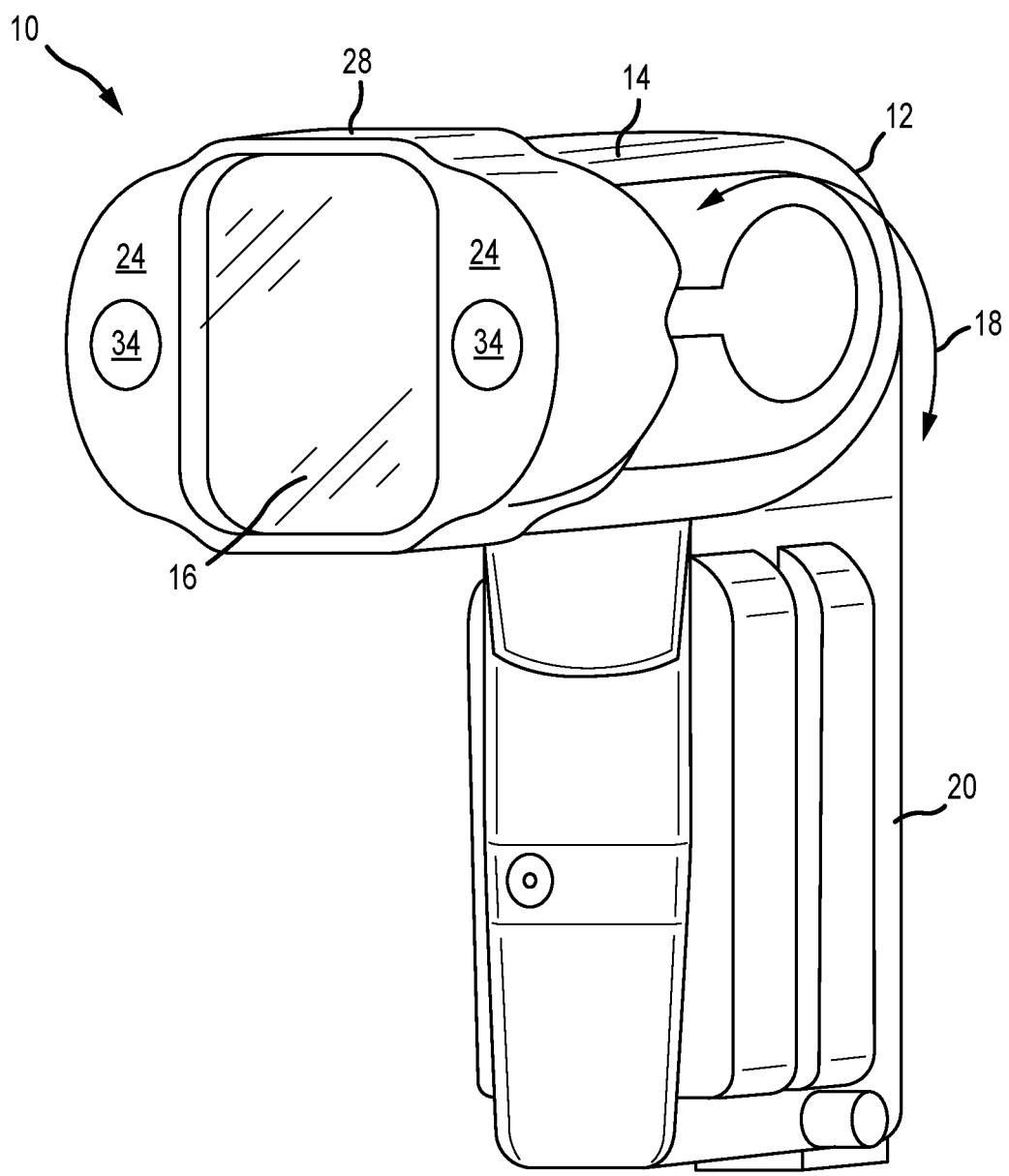
FIG. 1B is a perspective view of the camera accessory attachment element attached to an exemplary camera accessory.

FIG. 1A is a perspective view of an exemplary camera accessory attachment element 10. FIG. 1B is a perspective view of the camera accessory attachment element 10 attached to an exemplary camera accessory 12. Referring first to FIG. 1B, in the example, the camera accessory 12 is a flash unit (e.g., a speedlight) with a flash head 14 having a flash 16 that is rotatably mounted 18 on a control unit 20. The flash unit may be used for flash photography and used on or off camera. It is to be understood that the camera accessory 12 is merely an example and other camera accessories, such as, light meters, viewfinders, rangefinders, etc. as required or desired may also be used with the camera accessory attachment element 10 and the housing device described below.

Referring now to FIGS. 1A and 1B, the camera accessory attachment element 10 includes a body 22 having a face 24, a base 26, an exterior wall 28, and an interior wall 30 that defines an opening 32. Additionally, the camera accessory attachment element 10 includes an attachment element 34. In the example, the attachment element 34 is disposed in a housing element 36. In other examples, the attachment element 34 may be disposed at any other location on the body 22 as required or desired.

As illustrated, the body 22 is of a unitary construction. The body 22 may be configured such that it can elastically deform to attach around various parts of the camera accessory 12 (e.g., the flash head 14). In an example, the body 22 is made of a material that has an elastic property, such that it can deform or stretch during use but substantially return to its original shape, for example, the body 22 is in the form of a stretchable, flexible band. As such, the body 22 may be made from silicone, polyurethane, neoprene, rubber, elastomeric, elastic, elastic polymer, flexible rubber, or any other suitable material now known or later developed. In other examples, the body 22 may be rigid.

Still in other examples, the body 22 need not be of a unitary construction, but may be formed with various types of materials. For example, the body 22 may have portions that are flexible and portions that are rigid. Such an example may include a flexible body 22 with rigid elements affixed to the face 24. These rigid portions may be used as the attachment elements 34. Other examples may include using rigid element to provide structural support to the body. In aspects of the technology, the camera accessory attachment element 34 may be integrated and/or form a part of the flash head 14.

In the example, the body 22 includes exterior and interior walls 28, 30. One or more interior walls 30 at least partially define the opening 32 which is configured to receive at least a portion of the camera accessory 12. For example, the body 22 may have a single interior wall 30, which may form a substantially circular or oval shaped opening 32. In another example, the single interior wall 30 may form a rectangular shaped opening 32 with rounded corners. In other examples, there may be multiple interior walls 30 such that they form a square opening, a hexagonal opening and/or another polygonal shaped opening 32.

The opening 32 may be defined by a height H, a width W, and a depth D. In an example, the height H of the opening 32 may be approximately 1.5 inches, the width W may be approximately 2 inches, and the depth D may be approximately 0.7 inches. In the examples where the body 22 is flexible, the dimensions may be stretched from these original dimensions. Other dimensions are also contemplated.

FIG. 1B illustrates an attached configuration of the camera accessory attachment element 10 on the camera accessory 12. In an example, the use of flexible materials in the body 22 enables the camera accessory attachment element 10 to be used with camera accessories 12 having a variety of shapes and sizes. For example, the flexibility of the body 22 enables the camera accessory attachment element 10 to stretch and fit around the flash head 14 of the camera accessory 12. To attach the camera accessory attachment element 10, a user may stretch the body 22, orientate the body 22 so that the camera accessory 12 fits into the stretched opening 32 of the body 22, and then release the body 22. This enables the body 22 to compress around the camera accessory 12 and form a robust connection such that the camera accessory 12 does not easily slide out of the camera accessory attachment element 10. Such a configuration enables the body 22 to mount to a variety of camera accessory designs having different shapes and/or sizes. Additionally, the compression attachment around the camera accessory 12 enables the body 22 to be utilized in securing the camera accessory 12 within a housing device as described further below.

In the example, the camera accessory attachment element 10 is mounted around the flash head 14. As such, the face 24 is positioned to face outwardly from the camera accessory 12, while the base 26 is adjacent to the camera accessory 12. The outward facing face 24 facilitates securing the camera accessory 12 within the housing device described below. Though FIG. 1B illustrates the body 22 attached to the flash head 14, in other examples, the body may be attached to any other portion of the camera accessory 12 and/or a camera (not shown) as required or desired.

The attachment elements 34 are located proximate the face 24, and in some examples, directly on the face 24, of the camera accessory attachment element 10 to enable attachment to a corresponding connector element of the housing device. The attachment element 34 may be a variety of connection elements such as a hook-and-loop connector, a magnetic connector, a snap connector, a button connector, a clamp connector, a dovetail connector, and a threaded connector. Additionally, other types of connector elements are contemplated.

In the example, the attachment element 34 is a cylindrical permanent magnet, and may be a rare earth magnet. The attachment element 34 is removably inserted into the housing element 36 and disposed on either side of the opening 32. In other examples, the body 22 may be manufactured to permanently house the attachment elements 34 in the housing elements 36. Still in other examples, the attachment element 34 magnet is made of a flexible, elastic magnet that is incorporated into (or makes up in entirety) the body 22.

As illustrated, the two housing elements 36 are defined within the body 22 and protrude from the opening 32 along the width W. Each housing element 36 is adapted to receive the corresponding attachment element 34. More or less housing elements 36 may be used depending on the desired location and/or size of the attachment elements 34. Location of the attachment element 34 is chosen in such a way as to enable to the attachment of the camera accessory 12 to the housing device as described below. For example, in the examples having permanent magnets as the attachment elements 34, the magnets will align and magnetically couple to a corresponding ferromagnetic plate of the housing device.

Figure 2:
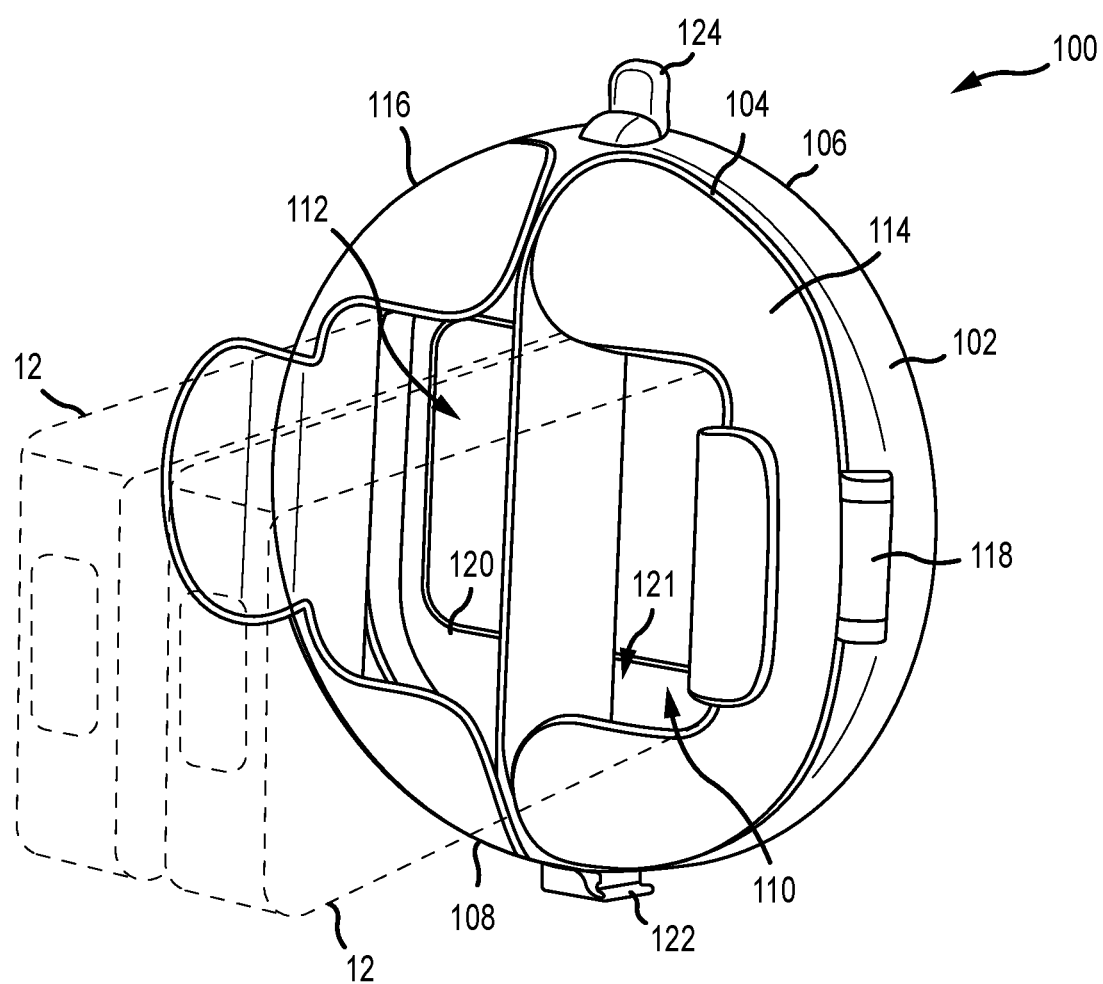
FIG. 2 is a front perspective view of an exemplary housing device in a closed position.

FIG. 2 is a front perspective view of an exemplary housing device 100 in a closed position. The housing device 100 may be utilized for attaching and supporting one or more camera accessories 12 for use with a camera (illustrated by dashed lines). In the example, the housing device 100 includes a housing 102 having a first end 104 and an opposite second end 106. As illustrated, the housing 102 includes a divider 108 extending from the first end 104. The housing 102 and the divider 108 form a first opening 110 and a second opening 112. In additional/alternative embodiments, there may be more or less than two openings). The openings 110, 112 extend through the housing 102 from the first end 104 to the second end 106 and are shaped and sized to receive a face (e.g., a flash head) of the camera accessory 12. Additionally, the openings 110, 112 may receive the camera accessory 12 with the camera accessory attachment element 10 (shown in FIGS. 1A and 1B) attached thereto. As illustrated in FIG. 2, the housing device 100 is shown in a closed position that secures the camera accessories 12 therein.

In the example, the housing 102 is substantially circular with the divider 108 extending across the diameter. As such, the first opening 110 and the second opening 112 are substantially symmetrical. In alternative examples, the divider 108 may be removable such that a single opening for a larger camera accessory is formed. In other examples, the housing may have more than two openings such that the device can support any number of camera accessories. For example, the housing can be divided into three sectors or the housing can be divided into quadrants, each having a discrete opening. In further examples, the housing may be formed in any other shape as required or desired (e.g., triangular, rectangular, oval, etc.).

As illustrated, the housing device 100 includes a first support element 114 disposed proximate the first opening 110 at the first end 104 and a second support element 116 disposed proximate the second opening 112 at the first end 104. In the example, the support elements 114, 116 are formed as substantially discrete U-shaped covers that are each rotatably coupled to the housing 102 by a hinge 118. The U-shaped covers are configured to extend around the head of the camera accessory 12 and support the camera accessory 12 within the housing 102. Although in some examples, the support elements 114, 116 may also be used to secure the camera accessory within the housing 102. In some aspects of the technology, no support elements are used.

As illustrated, a connector element 120 is disposed at the second end 106 of the housing 102. When the camera accessory 12 is secured within the housing 102, the flash head of the camera accessory 12 abuts the connector element 120 such that the camera accessory 12 is removably secured within the respective opening, and at least partially between the support elements 114, 116 and the connector element 120. In the example, the control unit of the camera accessory 12 may extend from the support device and away from the first end 104 of the housing 102. The connector element 120 is also configured to receive a peripheral device attachment element so that a peripheral device can be used with the camera accessory 12. The peripheral device attachment element 168 is described further below in reference to FIGS. 6-7C.

The connector element 120 includes a first surface 121 that faces the first end 104 of the housing 102 and a second surface 123 (shown in FIG. 4) that faces the second end 106 of the housing 102. In the example, the connector element 120 is a ferromagnetic plate that is configured to magnetically couple to corresponding magnets in other removable components so that those components are removably secured thereto. For example, a flash head may include magnets such that the face of the flash head may be removably coupled or secured to the connector element 120. The ferromagnetic plate may be any ferromagnetic material as required or desired, such as iron, nickel, cobalt, and some of their alloys. In additional/alternative embodiments, the some or all of the ferromagnetic plate may be magnetized.

In aspects of the technology, the first surface 121 receives the camera accessory 12 with the camera accessory attachment element 10 (shown in FIGS. 1A and 1B) attached to the flash head. As such, the camera accessory attachment element with its magnets is magnetically coupled to the connector element 120 to secure the camera accessory 12 within the housing 102. In some embodiments, the camera accessory 12 may include integral magnets so that the camera accessory 12 may magnetically couple to the connector element 120 without an additional accessory component.

Additionally/alternatively examples, the first surface 121 of the connector element 120 may be any other connector system, such as, but not limited to, a hook-and-loop connector, a snap connector, a button connector, a clamp connector, a dovetail connector, and a threaded connector as required or desired and that secures the camera accessory attachment element thereto. In other examples, the camera accessory 12 does not include the camera accessory attachment element and is secured within the housing 102 via only the support elements 114, 116. The flash head of the camera accessory 12 directly abuts the connector element 120 and the support elements 114, 116 are rotated so as to at least partially surround the flash head and the flash head is secured between the support elements 114, 116 and the connector element 120. This enables use of the housing device 100 without the camera accessory attachment element.

Similarly and as described further below, in aspects of the technology the second surface 123 receives the peripheral device with the peripheral device attachment element (shown in FIGS. 6-7C). As such, in examples, the peripheral device attachment element with its magnets is also magnetically coupled to the connector element 120, although opposite the camera accessory 12. In alternative/additional examples, the second surface 123 of the connector element 120 may be any other connector system, such as, but not limited to, a hook-and-loop connector, a snap connector, a button connector, a clamp connector, a dovetail connector, and a threaded connector as required or desired and that secures the peripheral device attachment element thereto. In some examples, the first surface 121 may have the similar connector elements to the second surface 123 (e.g., both magnetic connector systems), while in other examples, the first and second surfaces 121, 123 may have different connector systems.

As illustrated, the housing device 100 also includes a shoe plate 122. The shoe plate 122 is configured to slide into a clamp assembly (not shown) so that the housing device 100 may be mounted to an independent lighting stand or a camera. The shoe plate 122 can be either a "cold" shoe plate with no electrical contacts or a "hot" shoe plate with electrical contacts to facilitate electrically and communicatively coupling the housing device 100 to the camera or other camera components. As illustrated in FIG. 2, the shoe plate 122 is a cold shoe plate that is unitarily formed with the housing 102.

In aspects of the technology, a removal latch 124 is pivotably coupled to the housing 102 proximate the second end 106. The removal latch 124 is configured to de-couple the attachment element from the connector element 120, and is described further below in reference to FIG. 5. In the example, the removal latch 124 and the shoe plate 122 are positioned opposite one another on the housing 102 and at the 12 o'clock and 6 o'clock locations respectively, however, they may also be positioned at any other location on the housing as required or desired.

Figure 3:
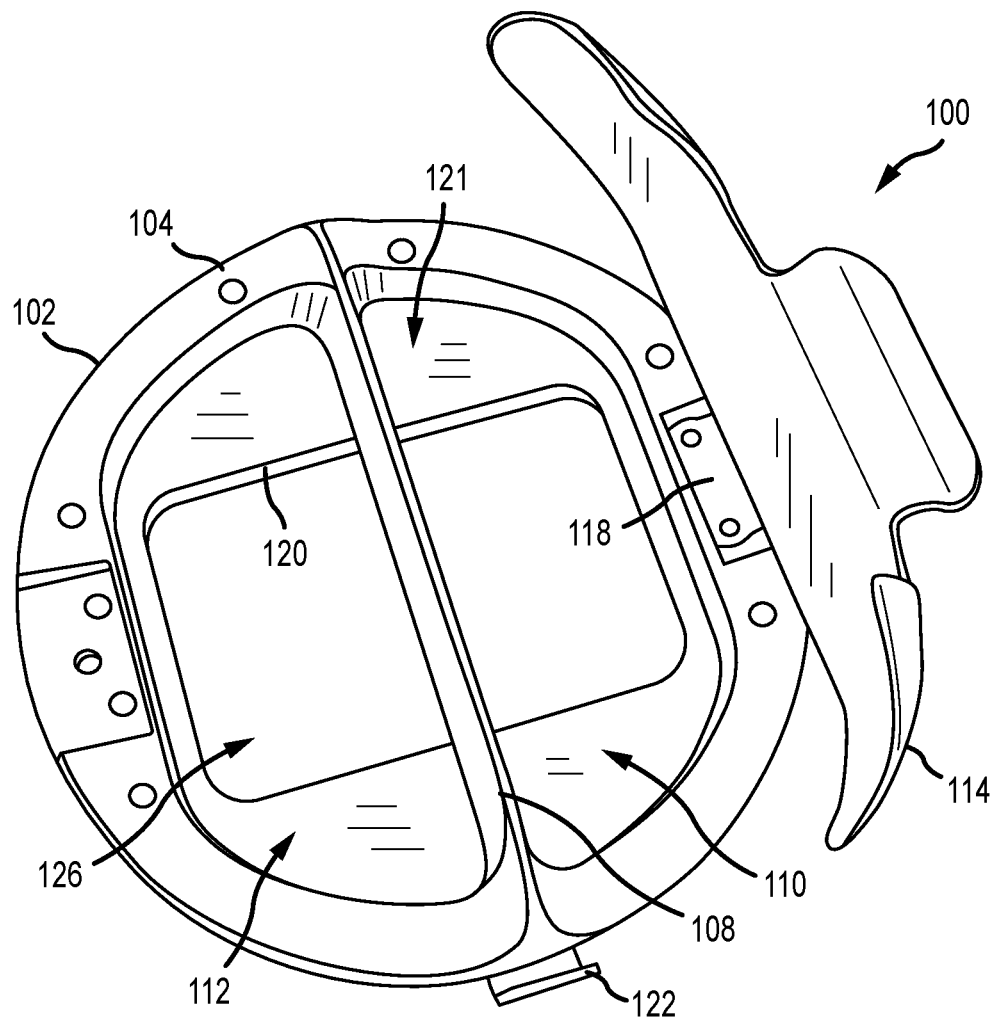
FIG. 3 is a front perspective view of the housing device in an open position.

FIG. 3 is a front perspective view of the example housing device 100 in an open position. The second support element and hinge are not shown for clarity. The first support element 114 is rotatably coupled to the housing 102 by the hinge 118. The hinge 118 is coupled to the first end 104 of the housing 102 at the 3 o'clock position so that the first support element 114 can rotate between the open position (as shown) and the closed position (as shown in FIG. 2). Similarly, but not illustrated, the second support element is rotatably coupled to the housing 102 by the hinge at the 9 o'clock position. By locating the hinges 118 on the outer portions of the housing 102, the support elements open away from the center of the housing 102, enabling the camera accessories to be positioned within the housing openings 110, 112 for securement. In aspects of the technology, the hinge may be located on the first divider 108.

The connector element 120 has a cutout 126 defined therein. In the example, the cutout spans across both the openings 110, 112. The cutout 126 enables the flash head of the camera accessory to abut the connector element 120 while positioning the flash for use during camera operation without obstruction. In some examples, the housing 102 may not include the support elements 114, 116, and the camera accessories may solely be secured within the housing by the camera accessory attachment element (shown in FIGS. 1A and 1B) securing to the connector element 120.

Figure 4:
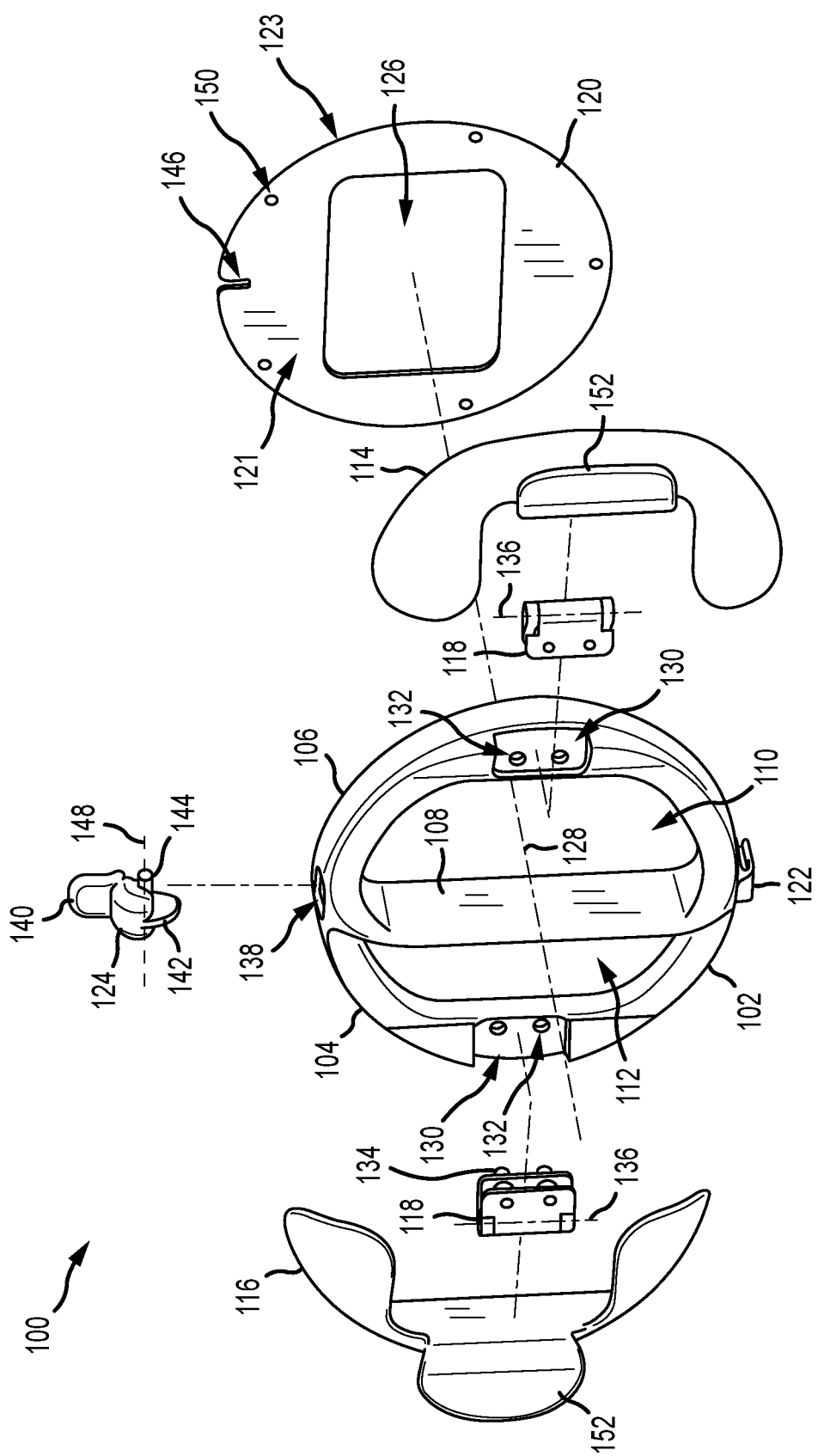
FIG. 4 is an exploded view of the housing device.

FIG. 4 is an exploded view of an example housing device 100. As illustrated, the housing 102 defines a longitudinal axis 128 extending from the first end 104 to the second end 106. The openings 110, 112 extend parallel to the longitudinal axis 128 and the divider 108 is oriented in a direction that is substantially orthogonal to the longitudinal axis 128. The first end 104 of the housing 102 includes hinge recesses 130 at the 3 o'clock position and 9 o'clock position. The hinge recess 130 is sized and shaped to receive the hinges 118 so that the support elements 114, 116 may close flush with the housing 102 when in the closed position (shown in FIG. 2). One or more apertures 132 are defined in the housing 102 so that the hinge 118 may be fastened thereto by one or more fasteners 134, for example, a screw or a bolt and a nut.

In the example, the hinges 118 may be formed by two plates connected by a pin. Each plate may include one or more apertures so as to connect the plate to the support elements 114, 116 or the housing 102 via the fasteners 134. Each hinge 118 opens in opposite directions so that the support elements 114, 116 rotate in opposite directions. The hinges 118 defines a rotation axis 136, and the rotation axis 136 is substantially orthogonally to the longitudinal axis 128. Other axis of orientation, however, may also be utilized. In alternative embodiments, the support elements 114, 116 may be rotatably coupled to the housing 102 through any other connection type that enables the housing device 100 to function as described herein.

As illustrated, a cavity 138 is defined in the housing 102 at the 12 o'clock position which is sized and shaped to receive the removal latch 124. The removal latch 124 includes a handle 140, an opposite lever arm 142, and a pivot 144. The removal latch 124 is pivotably mounted within the cavity 138, via the pivot 144, such that upon displacement of the handle 140, the lever arm 142 extends from the second end 106 of the housing 102 and out through a corresponding gap 146 defined in the connector element 120 at the 12 o'clock position. Aligning the lever arm 142 and the gap 146 along the longitudinal axis 128 facilitates the decoupling of the peripheral device attachment element 168 (shown in FIG. 6) from the connector element 120. The pivot 144 of the removal latch 124 defines a pivot axis 148 about which the handle 140 and lever arm 142 pivot around. The pivot axis 148 is substantially orthogonal to both the longitudinal axis 128 and the rotation axis 136; however, other axis orientations may also be utilized.

In aspects of the technology, the connector element 120 is substantially circular with a plurality of circumferentially spaced holes 150 so that the connector element 120 is coupled to the second end 106 of the housing 102 via a plurality of fasteners (not shown). In the example, the connector element 120 is a ferromagnetic plate as described above, so that the attachment elements (both the camera accessory and the peripheral device) may be magnetically coupled to the plate. In alternative examples, the connector element 120 may be any other connector system as required or desired by the attachment elements. In other examples, the connector element 120 may be integrally formed within the housing 102.

In examples, the support elements 114, 116 are substantially U-shaped so that it may cover and surround the camera accessory for securing within the housing device 100. A handle 152 may be integrally formed with and extend from the outer surface of the support elements 114, 116, enabling the covers to be rotated with respect to the housing 102. The support elements 114, 116 may further be shaped (e.g., at least partially curved) to correspond to the shape of the housing 102.

Figure 5:
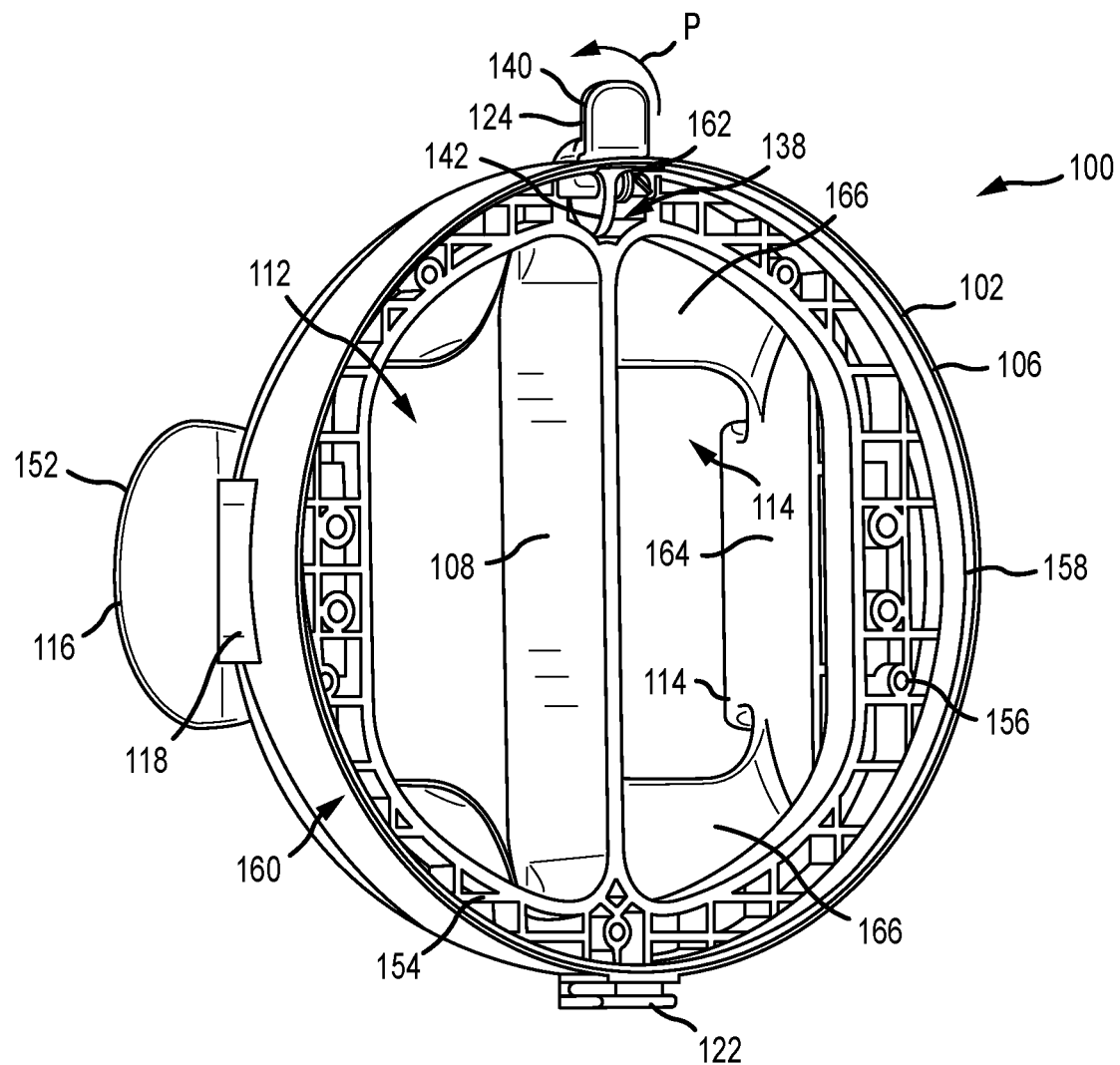
FIG. 5 is a rear perspective view of the housing device.

FIG. 5 is a rear perspective view of an example housing device 100. The connector element 120 (shown in FIGS. 2-4) is removed for clarity. The second end 106 of the housing 102 may be formed by a lattice structure 154 so as to lighten the weight of the housing device 100 while still providing strength to support the camera accessories attached thereto. Within the lattice structure 154, the second end 106 includes a plurality of fastener supports 156 that enable the connector element to be secured to the second end 106. A circumferential lip 158 is formed around the second end 106 and is an extension of an outer circumferential surface 160 of the housing 102. The lip 158 extends away from the lattice structure 154 and along the longitudinal axis such that the connector element may be recessed within the housing 102, when coupled to the second end 106.

In aspects of the technology, the removal latch 124 is pivotably mounted within the cavity 138 of the housing 102. The handle 140 of the removal latch 124 is pivotable between a first position (as illustrated in FIG. 5) to a second position (not shown). In the first position, the lever arm 142 is retracted and disposed within the cavity 138. When the handle 140 is pivoted P to the second position, the lever arm 142 extends from the second end 106 of the housing 102 and out of the cavity 138. Additionally, the lever arm 142 extends from the gap 146 of the connector element 120 (shown in FIG. 4) so as to engage with the peripheral device attachment element 168 (shown in FIG. 6) when it is coupled to the connector element. Once the lever arm 142 engages with the attachment element, the lever arm 142 urges the attachment element away from the connector element to enable the de-coupling of the attachment element. This facilitates a quick and easy switch of peripheral devices that for use with the camera accessories. In the example, the removal latch 124 is biased into the first position with a biasing member 162 (e.g., a spring).

In aspects of the technology, each support element 114, 116 is formed as a substantially U-shaped cover. The cover includes a side wall 164 that forms the base of the U-shape and two concave projections 166 extending from the side wall 164 that form the legs of the U-shape. The camera accessory is supported between the divider 108 and the side wall 164, while the concave projections 166 at least partially surround the camera accessory, when the camera accessory is supported in the housing device 100. Additionally, in the example, the handle 152 of the cover extends from the side wall 164.

Figure 6:
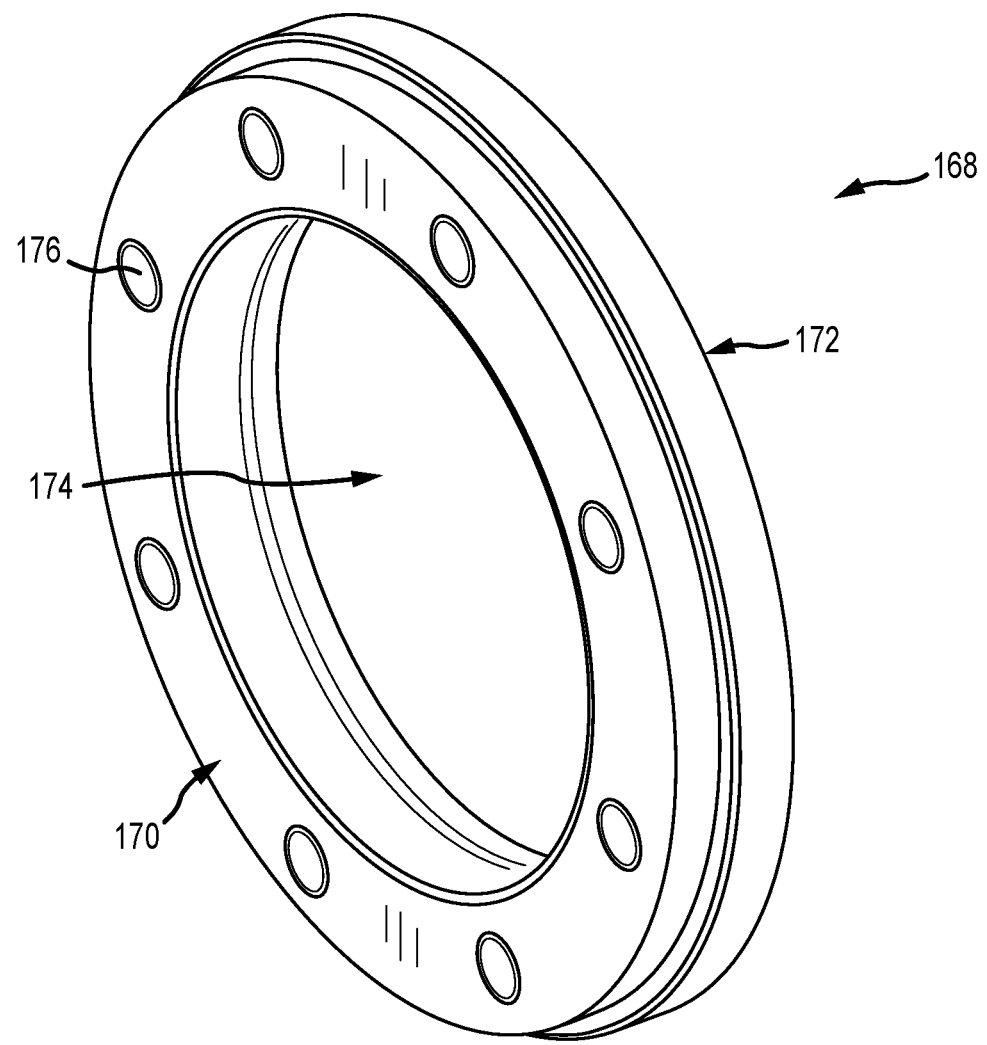
FIG. 6 is a perspective view of an exemplary peripheral device attachment element.

FIG. 6 is a perspective view of an exemplary peripheral device attachment element 168. The peripheral device attachment element 168 is removably coupleable to the connector element 120 (shown in FIGS. 2-4) and facilitates the use of a peripheral device (not shown). In the example, the peripheral device attachment element 168 is substantially ring shaped and includes a connector surface 170, an opposing peripheral device surface 172, and a central passage 174. In the example, the connector surface 170 includes a plurality of circumferentially spaced magnets 176 so that the attachment element 168 is magnetically coupleable to the connector element opposite the camera accessory. In other examples, the connector surface 170 may include components for any other connection system such as, but not limited to, a snap connector, a clamp connector, a threaded connector, a hook-and-loop connector, or a dovetail connector as required or desired. While shown as a separate device, the connector element may be integral to the body of the housing device 100 (or other device).

In aspects of the technology, the connector surface 170 is sized and shaped to fit at least partially within the second end of the housing so as to couple to the connector element. In the example, the connector surface has a diameter that is sized to correspond to the lip 158 of the housing 102 (shown in FIG. 5) such that the peripheral device attachment element 168 can be positioned against the lip 158 when attached to the housing device. This facilitates ease of positioning of the peripheral device attachment element 168 and thereby the peripheral device. The central passage 174 is sized and shaped such that the cutout 126 of the connector element (shown in FIG. 4) is not obstructed when the peripheral device attachment element 168 is attached thereto. This enables the flash head of the camera accessory to be positioned within the housing device so that the flash may be used without obstruction.

Figure 7A:
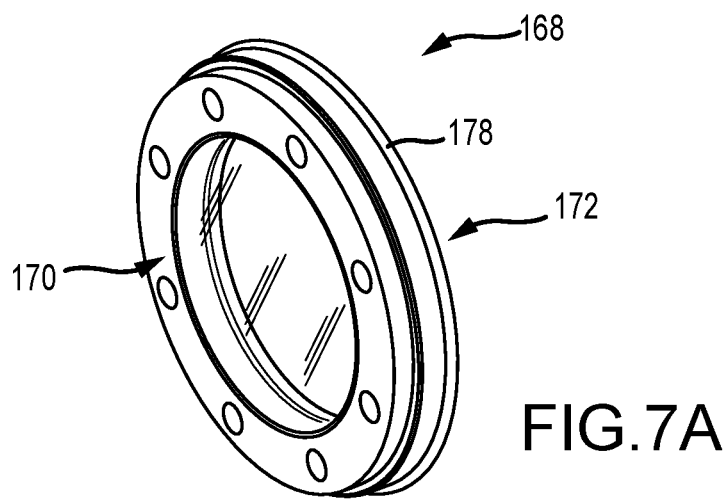
FIGS. 7A-7C are perspective views of the peripheral device attachment element with peripheral devices.
Figure 7B:
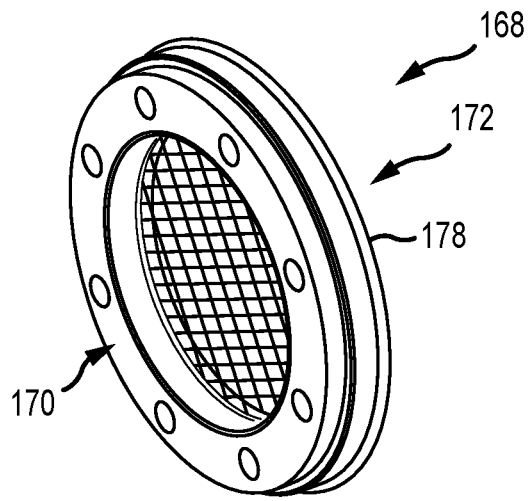
Figure 7C:
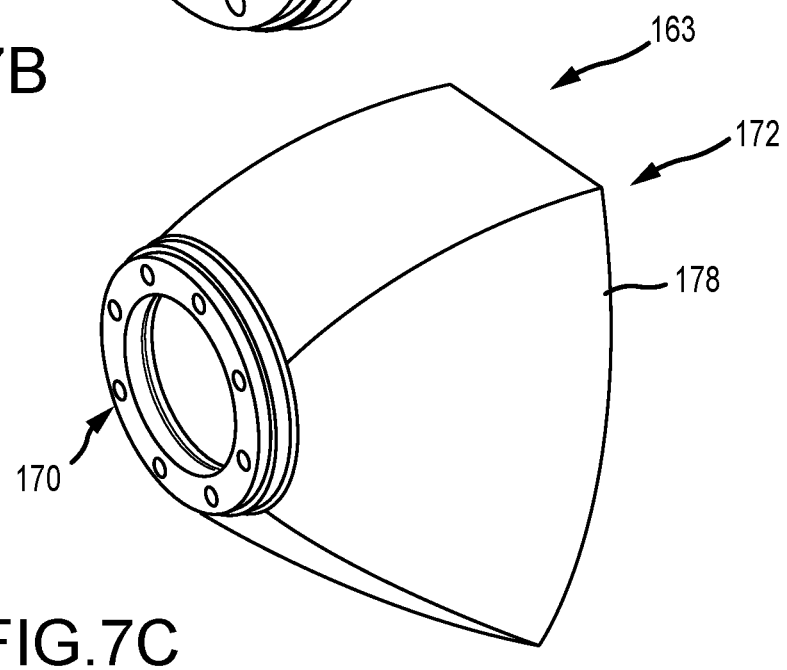

FIGS. 7A-7C are perspective views of the example peripheral device attachment element 168 with peripheral devices. In each figure, the peripheral device surface 172 includes a peripheral device 178 that is integrally formed on the attachment element 168. However, in other examples, the peripheral devices 178 may be removably attached to the peripheral device surface 172, such that more than one peripheral device 178 may be utilized with one attachment element 168. The peripheral device 178 may be attached to the peripheral device surface 172 by any connection system that enables the housing device to function as described herein, for example, a magnetic connector, a snap connector, a clamp connector, a threaded connector, a hook-and-loop connector, or a dovetail connector as required or desired. Though FIGS. 7A-7C illustrate the peripheral device 178 as attachable to the housing device via the connection element, the peripheral device 178 may be attached to other portions of the housing device including, around the outer surface of the housing.

FIG. 7A illustrates the peripheral device 178 that includes a filter. The filter may be a transparent or translucent object, for example, the filter may have optical reflectance or refractive properties. The filter may be made of glass, plastic, a transparent or translucent polymer, or any other material now known or later developed.

FIG. 7B illustrates the peripheral device 178 that includes a grid. FIG. 7C illustrates the peripheral device 178 that includes a light directing device. In one example, the light directing device may be a directing dish. In another example, the light directing device may be a soft box. While a number of peripheral devices are shown and described herein, other types of peripheral devices that are used with camera accessories may be included as required or desired.

Figure 8A:
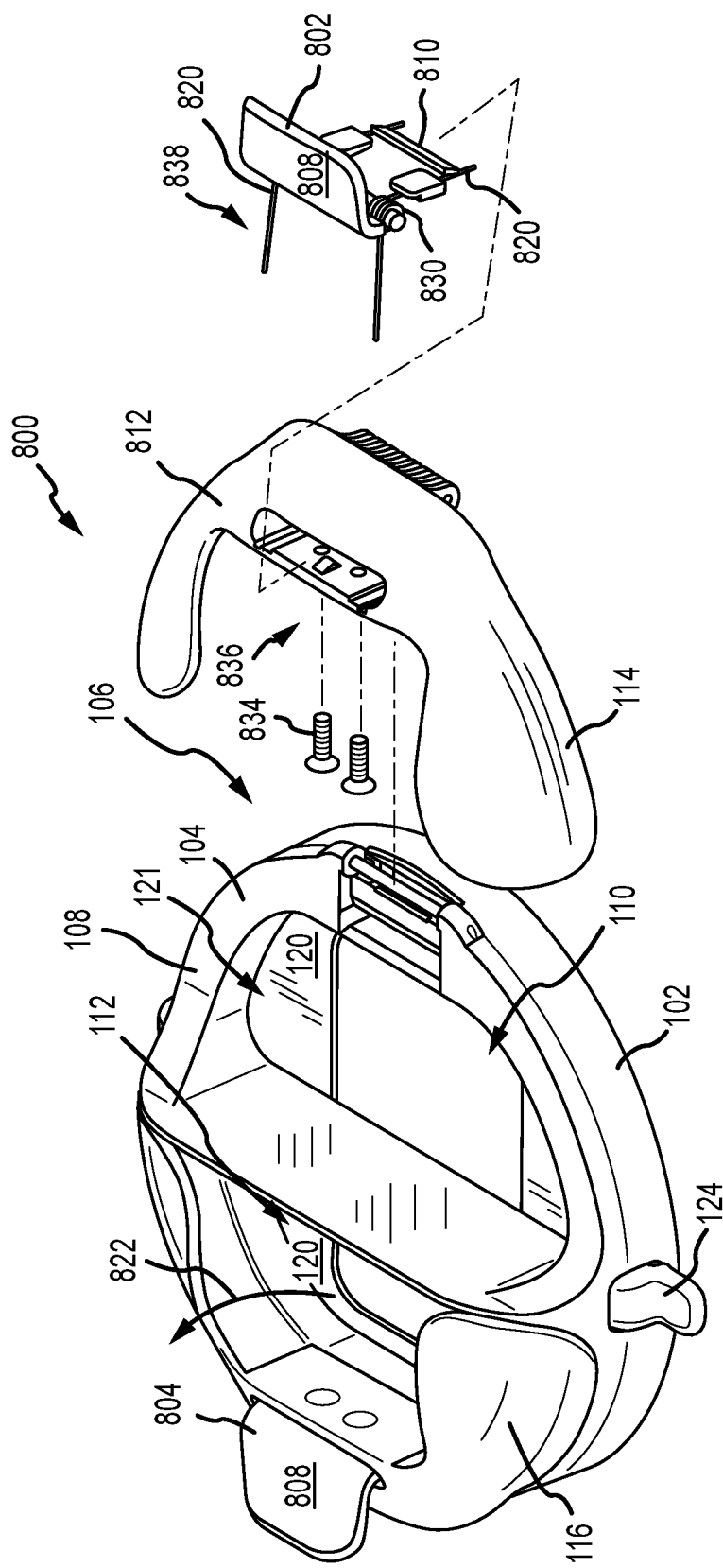
FIG. 8A is an exploded view of another example of a housing device.
Figure 8B:
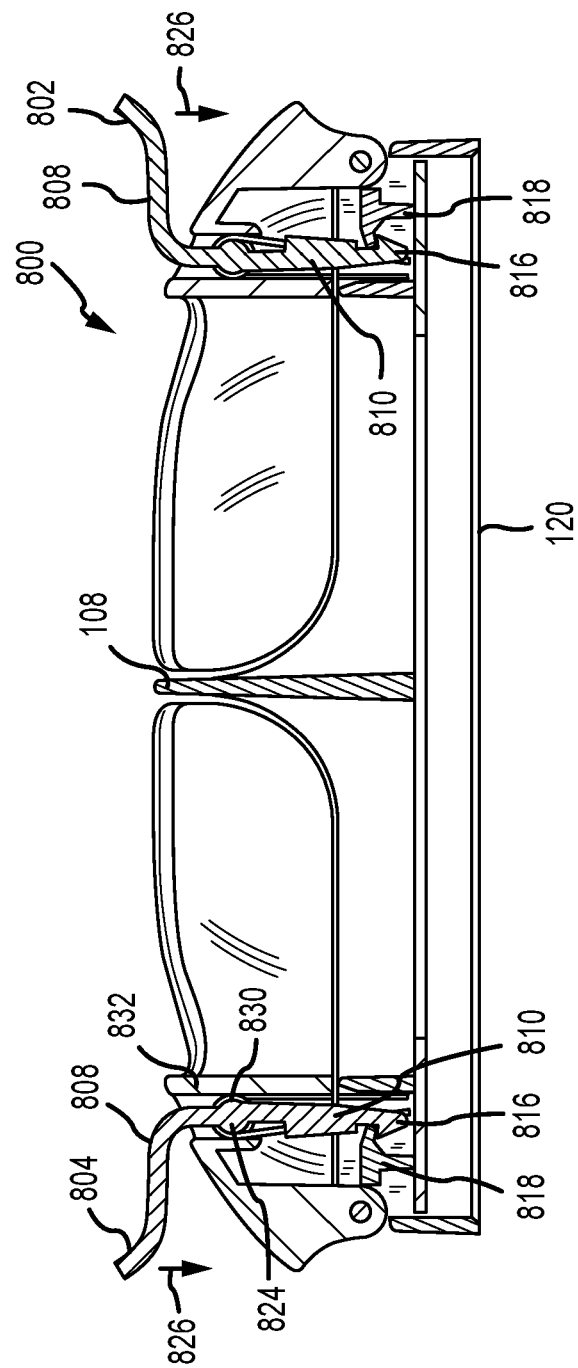
FIG. 8B is a cross-sectional view of the housing device shown in FIG. 8A.

With reference to FIGS. 8A and 8B, FIG. 8A presents an exploded view of an alternative embodiment of a housing device 800, and FIG. 8B presents a cross-sectional view of the alternative embodiment of the housing device 800. Certain components are described above, and as such, are not necessarily described further. As illustrated, the housing device 800 includes a first release handle 802 that operates to engage the first support element 114 to the housing 102 when in a closed position. Similarly, the housing device includes a second release handle 804 that operates to engage a second support element 116 to the housing 102 when in a closed position. By positively engaging the support elements 114, 116 to the housing 102 when closed, unintentional opening is thereby reduced and/or prevented.

The release handles 804 and 802 each have a handle arm portion 808 and a latch arm portion 810. When inserted through a channel 812 of a support element (such as first support element 114 or second support element 116), a latch 816 located on the distal-end of the latch arm portion 810 operatively engages with a post 818 that extends from the housing 102. One or more tension elements 820, which are illustrated as springs, provides a force along an axis of rotation 822 to bias the latch 816 in the engaged or closed position.

When a camera accessory (such as camera accessory 12) is inserted into an opening, such as a first opening 110, the tension element 820 may be loaded with a force by rotating the latch arm portion 810 in a direction towards the connector element 120. That is, as the tension element 820 is loaded, the latch arm portion 810 of the release handle 804 pivots around a pivot 824 and downward with respect to the axis of rotation 822. This pivoting of the latch arm portion 810 induces engagement of the latch 816 with the post 818 and enables the support elements 114, 116 to close.

Rotation about an axis of rotation 822 may be facilitated by pivot elements. For example, in aspects of the technology, a pivot element 830, such as cylindrical-shaped protrusions 830 are guided by a seat 832 that is formed within the support elements 114, 116. For example, the protrusions 830 may extend longitudinally across a side of the lever arm portion 810 and are shaped to correspond to the seat 832. For example, the seat 832 is curvilinear to the shape of the protrusion 830.

At the termination of the rotation of the lever arm portion 810, the tension element 820 biases the latch arm portion 810 back to is engaged or closed position such that the latch 816 may engage with the post 818. The result is that the support elements 114, 116 are engaged with the housing until the latch 816 is disengaged with the post 818. For example, by depressing the handle arm portion 808 downward along a direction 826 so that the latch 816 disengages with the post 818. When a camera accessory is coupled to the first surface 121, this causes a force against a camera accessory 12 along an axis 822 upward away from the connector element 120, which may aid a user in removing the camera accessory. For example, the ends 838 of the tension element 820 may be between the face 120 and the end of the camera accessory coupled to the face 120. Additionally, disengaging the latch 816 enables a support element (such as first support element 114) to be rotated about an axis allowing the support element to be transitioned to the open position as described further above.

The release handles 804 and 802 may be secured using one or more attachment elements 834, which is illustrated as two screws. The screws may be inserted through an interior side 836 of the channel 812 and through the lever arm portion 810 of a release handle 804. The attachment elements may then insert into a threaded bore of a support element, such as first support element 114 or second support element 116. The attachment elements 834 are configured to couple the release handles 802, 804 to the support elements 114, 116 while still enabling the release handles 802, 804 to pivot with respect thereof.

Figure 9:
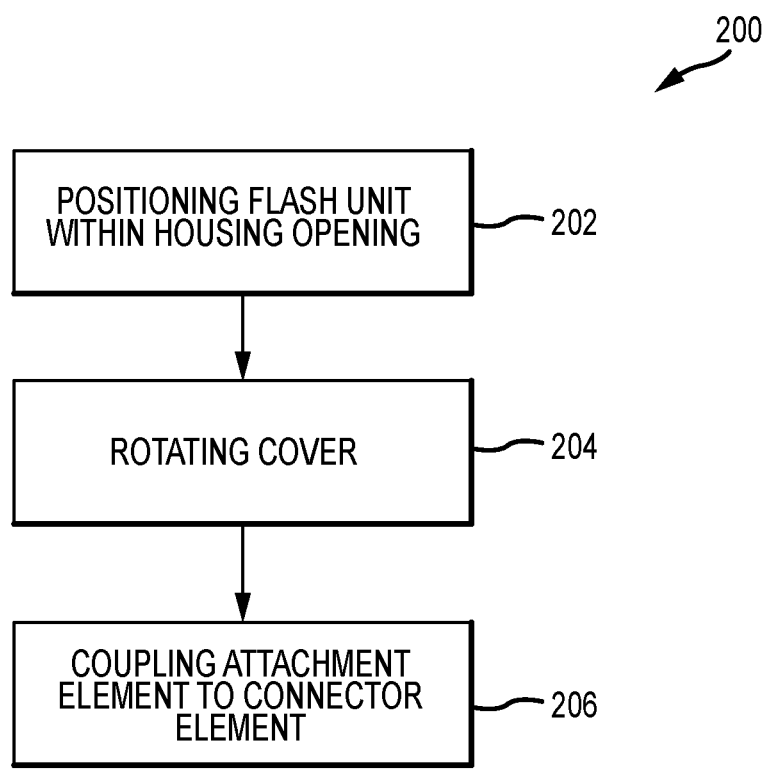
FIG. 9 is a flowchart illustrating a method of positioning one or more flash units within a housing device for use with a camera.

FIG. 9 is a flowchart illustrating a method 200 of positioning one or more flash units within a housing device for use with a camera. In aspects, one or more flash units are positioned at least partially within one or more corresponding openings defined by a housing of the housing device (operation 202). The housing includes, as an example, a connector element disposed on a first end, and at least a portion of the one or more flash units abuts the connector element. One or more covers may be rotated to removably support the one or more flash units within the housing and between the one or more covers and the connector element (operation 204). The one or more covers may be rotatably coupled to a second end of the housing. An attachment element may then be magnetically coupled to the connector element (operation 206). The attachment element may include one or more of a grid, a filter, or a light directing device.

The materials utilized in the mounting devices described herein may be those typically utilized for camera and camera accessory manufacture. For example, moldable plastics may be used for the housing, while aluminum, steel, stainless steel, zinc, or composite materials can be utilized for the other components.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components and individual functions can be distributed among different components. In this regard, any number of the features of the different embodiments described herein may be combined into one single embodiment and alternate embodiments having fewer than or more than all of the features herein described as possible.

While various embodiments have been described for purposes of this disclosure, various changes and modifications may be made which are well within the scope of the disclosed methods. Numerous other changes may be made which will readily suggest themselves to those skilled in the art and which are encompassed in the spirit of the disclosure.

What is claimed:

1. A device for at least one camera accessory, the device comprising:
   a housing comprising a first end and an opposite second end, wherein the housing defines at least one opening extending therethrough, the at least one opening configured to receive at least a portion of the at least one camera accessory;
   at least one support element disposed at the first end, the support element comprising a cover rotatably coupled to the first end;
   a connector element disposed at the second end capable of removably securing the at least one camera accessory within the at least one opening abutting the connector element;
   wherein the at least one camera accessory is selected from the group consisting of: a light grid, a light filter, a light diffusers, and a light directing device; and
   further comprising at least one attachment element to removably couple to the connector element, wherein the connector element is a ferromagnetic plate and the at least one attachment element comprises one or more magnets, the at least one attachment element being magnetically couplable to the connector element.

2. The device of claim 1, wherein the housing defines a longitudinal axis extending from the first end to the second end, and wherein the cover is rotatable around a rotation axis that is substantially orthogonal to the longitudinal axis.

3. The device of claim 1, wherein the cover is rotatably coupled to the first end by a hinge.

4. The device of claim 1, wherein the housing further comprises a divider that separates the at least one opening into a first opening and a second opening, the first opening and the second opening each having a discrete support element.

5. The device of claim 4, wherein the divider extends outwardly from the first end of the housing.

6. The device of claim 1, further comprising a shoe plate.

7. The device of claim 1, wherein the connector element comprises one of a magnet connector, a snap connector, a clamp connector, a ferromagnetic plate, or a threaded connector.

8. The device of claim 1, wherein a first attachment element of the at least one attachment element is substantially ring shaped.

9. The device of claim 8, wherein the first attachment element comprises a connector surface and an opposing peripheral device surface, wherein the peripheral device surface comprises one of a grid, a filter, or a light directing device.

10. The device of claim 1, wherein a second attachment element of the at least one attachment element comprises a flexible body configured to secure to at least a portion the camera accessory.

11. The device of claim 1, further comprising a removal latch pivotably coupled to the housing, the removal latch configured to de-couple the at least one attachment element from the connector element.

12. The device of claim 11, wherein the removal latch comprises a handle and a lever arm, the handle pivotable from a first position to a second position, and wherein when the handle is in the second position, the lever arm extends from the second end of the housing and engages with the at least one attachment element, urging at least a portion of the at least one attachment element away from the connector element.

13. The device of claim 11, wherein the removal latch pivots about a pivot axis that is substantially orthogonal to a longitudinal axis defined by the housing and a rotation axis defined by the cover.

14. The device of claim 1, wherein the cover is substantially U-shaped, and when the camera accessory is secured within the at least one opening, the cover extends around at least a portion of the camera accessory.

15. A device for mounting a plurality of flash units for use with a camera, the device comprising:
   a substantially circular housing comprising a first end and an opposite second end, the housing further comprising a divider forming a plurality of symmetrical openings extending through the housing, wherein each opening of the plurality of openings is configured to receive at least a portion of a flash unit of the plurality of flash units;
   a plurality of covers rotatably coupled to the first end, each cover of the plurality of covers corresponding to an opening of the plurality of openings;
   a ferromagnetic plate disposed at the second end, wherein each flash unit of the plurality of flash units is configured to removable secure within the corresponding opening of the plurality of openings while abutting the magnetic plate.

16. The device of claim 15, further comprising a flexible body configured to attach around at least a portion of each flash unit, the flexible body comprising at least one magnet configured to magnetically couple to the magnetic plate.

17. The device of claim 15, further comprising a soft box, the soft box comprising a magnetic ring configured to magnetically couple to the magnetic plate.

18. A method of positioning one or more flash units within a device for use with a camera, the method comprising:
- positioning the one or more flash units at least partially within one or more corresponding openings defined by a housing of the device, the housing including a connector element disposed on a first end, and wherein at least a portion of the one or more flash units abuts the connector element;
- rotating one or more covers to removably support the one or more flash units within the housing between the one or more covers and the connector element, wherein the one or more covers are rotatably coupled to a second end of the housing; and
- magnetically coupling an attachment element to the connector element, wherein the attachment element includes one or more of a grid, a filter, or a light directing device.

* * * * *